US012764110B2

(12) United States Patent
Luria et al.

(10) Patent No.: US 12,764,110 B2
(45) Date of Patent: *Oct. 13, 2026

(54) PEER-TO-PEER AUTHENTICATION WITH A SECURE CHANNEL COMMUNICATION

(71) Applicant: Citibank, N.A., New York, NY (US)

(72) Inventors: Elroi Luria, Ramat Gan (IL); Shay Davidpur, Ness Ziona (IL); Dina Vaingolts, Ramat Gan (IL); Yaniv Bouhadana, Netanya (IL); Oded Margalit, Ramat Gan (IL)

(73) Assignee: Citibank, N.A., New York, NY (US)

( * ) Notice: Subject to any disclaimer, the term of this patent is extended or adjusted under 35 U.S.C. 154(b) by 77 days.

This patent is subject to a terminal disclaimer.

(21) Appl. No.: 19/054,763

(22) Filed: Feb. 14, 2025

(65) Prior Publication Data

US 2025/0193180 A1 Jun. 12, 2025

Related U.S. Application Data

(63) Continuation of application No. 17/244,548, filed on Apr. 29, 2021, now Pat. No. 12,255,893.

(51) Int. Cl.
*H04L 9/40* (2022.01)
*H04L 67/104* (2022.01)

(52) U.S. Cl.
CPC ........ *H04L 63/0869* (2013.01); *H04L 63/083* (2013.01); *H04L 63/20* (2013.01); *H04L 67/104* (2013.01)

(58) Field of Classification Search
CPC ... H04L 63/0869; H04L 63/083; H04L 63/20; H04L 67/104; H04L 63/0838; H04L 63/0861; H04L 63/104
See application file for complete search history.

(56) References Cited

U.S. PATENT DOCUMENTS 10,721,225 B1 * 7/2020 Baszucki ................ H04L 51/10
2017/0063838 A1 * 3/2017 Yin ..................... H04L 63/0823
(Continued)

FOREIGN PATENT DOCUMENTS

WO WO-2020060114 A1 * 3/2020 ............. H04L 63/20

OTHER PUBLICATIONS

Dai et al., A group-based End-to-end Identity Authentication Method for Massive Power Wireless Private Network, Jun. 2020, IEEE, 2020 IEEE 10th Edition, 14-17 (Year: 2020).*

*Primary Examiner* — Catherine Thiaw
*Assistant Examiner* — Nega Woldemariam
(74) *Attorney, Agent, or Firm* — Ashurst Perkins Coie US LLP

(57) ABSTRACT

An identity verification system enables peer-to-peer authentication in a potentially insecure channel by leveraging a secure channel communication. The system authenticates a user via an identity verification application. The system provides a validation code to the user. The user communicates the validation code to a counterparty of the peer-to-peer communication. The system receives a request to authenticate the counterparty with the validation code and counterparty authentication data. The system authenticates the counterparty and sends the user the authentication of the counterparty. Alternatively, the user device communicates a request to generate a secure code for participants in a first insecure group application session. The user device selects an authenticated counterparty to receive the secure code from a list of authenticated counterparties. The user creates a second application session using the secure code as a password. Unauthenticated counterparties would not receive the secure code and are restricted from the new session.

20 Claims, 4 Drawing Sheets

(56) References Cited

U.S. PATENT DOCUMENTS

| | | | | |
|---|---|---|---|---|
| 2017/0093910 | A1* | 3/2017 | Gukal | H04L 63/1416 |
| 2018/0302401 | A1* | 10/2018 | Chan | H04L 63/0892 |
| 2020/0137566 | A1* | 4/2020 | Jin | H04W 12/43 |
| 2020/0280441 | A1* | 9/2020 | Ben-David | H04W 12/48 |
| 2020/0344602 | A1* | 10/2020 | Li | H04L 67/125 |
| 2020/0391695 | A1* | 12/2020 | Yang | G06F 21/35 |
| 2021/0218725 | A1* | 7/2021 | Fang | H04L 9/0894 |
| 2021/0400479 | A1* | 12/2021 | Li | H04L 63/0869 |
| 2022/0078029 | A1* | 3/2022 | Galdo | H04L 9/3263 |
| 2022/0386104 | A1* | 12/2022 | Chaugule | H04W 8/183 |
| 2023/0262641 | A1* | 8/2023 | Agarwal | H04M 15/49 455/406 |

* cited by examiner

PEER-TO-PEER AUTHENTICATION WITH A SECURE CHANNEL COMMUNICATION

CROSS-REFERENCE TO RELATED APPLICATION(S)

This application is a continuation of U.S. patent application Ser. No. 17/244,548, filed Apr. 29, 2021. The content of the foregoing application is incorporated herein in its entirety by reference.

FIELD OF THE INVENTION

The present invention relates generally to the field of user authentication, and more particularly to methods and systems for peer-to-peer authentication in a potentially insecure channel by leveraging a secure channel communication.

BACKGROUND OF THE INVENTION

Applications that utilize online, cloud-based, and networked access for users and customers employ policies to limit access to the applications and communications between users. Users must authenticate themselves to access applications such as email or financial transaction applications. Users often are required to use passwords to access group applications, such as online meetings, video calls, or social network conversations.

Potentially malicious actors may attempt to identify user passwords or other identity information to gain access to restricted information on these applications. Some malicious actors may gain access to the identity information via system hacks, password leaks, social engineering, or any other illegal or unethical methods.

For example, a malicious actor may contact a user in a communication application under the guise of being a customer support representative for a financial account of the user. The malicious actor encourages the user, through deceitful means, to provide identification and authentication data, which the malicious actor uses to access a secure user account. Malicious actors may also use information gained through illegal entry into user accounts to learn about online meetings, video conferences, conference calls, and other password protected events where proprietary or secure information is being discussed or shared. The malicious actor may use the information from the user accounts to infiltrate the event to gain access to the discussed information. Malicious actors may even use private information and other tactics to authenticate themselves during telephone conversations, in-person conversations, or other non-digital communications.

There is a present need for a solution that resolves all of the foregoing issues and provides, for example, improved methods and systems to authenticate peer-to-peer communications in potentially insecure applications or communications.

SUMMARY OF THE INVENTION

Embodiments of the invention employ computer hardware and software, including, without limitation, one or more processors coupled to memory and non-transitory computer-readable storage media with one or more executable programs stored thereon that instruct the processors to perform the methods and processes described herein. Such embodiments are directed to technological solutions that may involve systems that include, for example, at least one processor coupled to memory and programmed to enable peer-to-peer authentication in a potentially insecure channel by leveraging a secure channel communication.

In an example, a system associated with an identity verification application may receive, from a user computing device, a request to authenticate a user and user authentication data from an identity verification application operating on the user computing device. The system communicates, to the user computing device, a validation code upon authenticating the user. The user may then communicate the validation code to a counterparty in an potentially insecure communication application. The system then receives, from a counterparty computing device, a request to authenticate a counterparty with the validation code and counterparty authentication data. The system associates the request with the user based on the received validation code. The system then authenticates the counterparty based at least on the user authentication data and communicates, to the user computing device, the authentication of the counterparty. The authentication of the counterparty may include one or more of a picture and a name of the counterparty.

In an example, the system also communicates the authentication of the user to the counterparty computing device to allow the parties to confirm the identity of each other. In an example, the user authentication data is a fingerprint, facial image, or any other biometric authentication feature. In another example, the user answers challenge questions. In another example, the user enters one or more passwords known only to the user. In an example, the requests for authentication are received from an identity verification application operating on the counterparty computing device and on the user computing device.

In another example of the technology, the user and the counterparty are communicating on an application that is separate from the identity verification application, such as a video call, a conference call, a text group, email group, social media board, or any other suitable technology. In an example, the validation code is a randomly-generated alphanumeric code, a QR code, a barcode, or any other suitable code. In an example, the user communicates the validation code to the counterparty verbally, visually, via text message, or via any other suitable technology or method.

In other examples, a method to enable peer-to-peer authentication in a potentially insecure channel by leveraging a secure channel communication includes joining, by a user computing device, a first potentially insecure group application session with one or more counterparties. An identity verification system device authenticates the user and one or more counterparties in the first potentially insecure group application session as described herein. The user computing device communicates to the identity verification system device a request to generate a secure code and to communicate the secure code to a counterparty computing device selected from a list of the one or more authenticated counterparties in the first potentially insecure group application session. The identity verification system device communicates the generated secure code to the user computing device and the selected counterparty computing device. After receiving the secure code, the user computing device creates a second potentially insecure group application session based on the secure code. In an example, the second insecure group application created by the user includes a password that is based on the secure code. The user computing device and the counterparty computing device join the second potentially insecure group application session by signing in with the secure code.

In the example, the identity verification system device communicates to the user computer device a list of authenticated computing devices via an application associated with the identity verification system. In another example, the user computing device communicates the request to generate the secure code based on a determination that a suspicious party is participating in the first potentially insecure group application session. In another example, the user computing device selects the counterparty computing device to which the identity verification system device is to send the secure code from the list of authenticated counterparties.

Other aspects include computer program products that perform the methods and actions described herein.

The technology described herein allows a user to be protected from unlawful or illicit intrusions on secure conversations, meetings, or other group events. The user is able to determine the authenticated identify of a counterparty to ensure that the counterparty is not an imposter. Conventional systems only present a username, avatar, name, title, or other identification of a counterparty. The user is unable to verify the identity of the counterparty because emails, network systems, or other systems may be hacked or otherwise compromised by a malicious actor. Sending new instructions or passwords to a counterparty to escape a malicious actor are ineffective because the malicious actor may have access to the emails, texts, or other communications and simply obtain the new instructions or passwords. The current technology creates secure codes or validation codes at a secure server that is inaccessible by the malicious actor and even the user. The secure server creates the codes and communicates them directly to an application on the user device, avoiding any potentially insecure systems such as email or text.

These and other aspects of the invention will be set forth in part in the description that follows and in part will become more apparent to those skilled in the art upon examination of the following or may be learned from practice of the invention. All such aspects are to be included within this description, are to be within the scope of the present invention, and are to be protected by the accompanying claims.

DETAILED DESCRIPTION

Example System Architecture

In example architectures for the technology, while each server, system, and device shown in the architecture is represented by one instance of the server, system, or device, multiple instances of each can be used. Further, while certain aspects of operation of the technology are presented in examples related to the figures to facilitate enablement of the claimed invention, additional features of the technology, also facilitating enablement of the claimed invention, are disclosed elsewhere herein.

Figure 1:
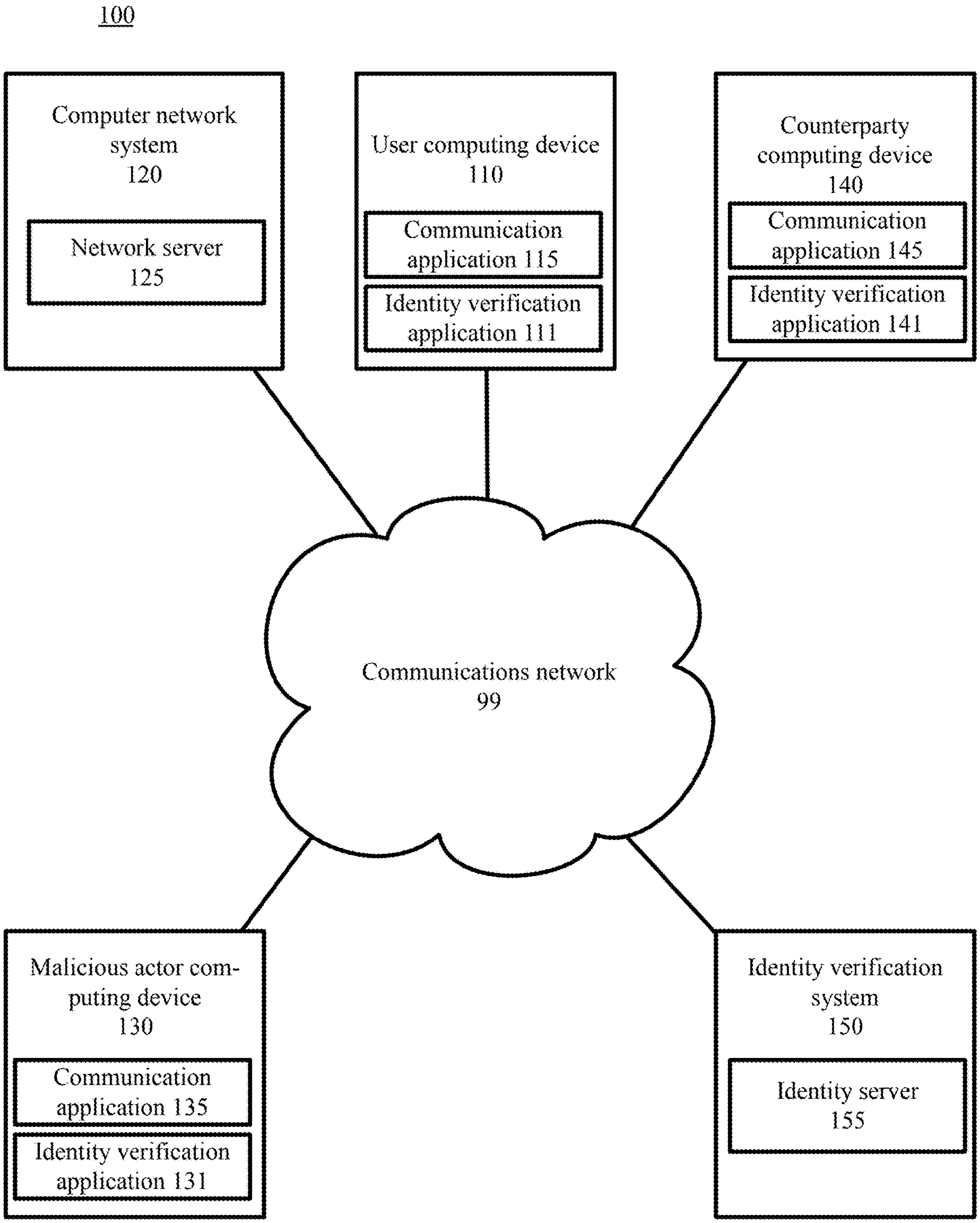
FIG. 1 is a block diagram depicting a system to verify identifications of users in a potentially insecure application.

FIG. 1 is a block diagram depicting a system to verify identifications of users in a potentially insecure application, in accordance with certain examples. As depicted in FIG. 1, the architecture 100 includes a computer network system 120, one or more user computing devices 110, a malicious actor computing device 130, a counterparty computing device 140, and an identity verification system 150 connected by communications network 99.

Each network, such as communication network 99, includes a wired or wireless telecommunication mechanism and/or protocol by which the components depicted in FIG. 1 can exchange data. For example, each network 99 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, Wi-Fi, or any combination thereof or any other appropriate architecture or system that facilitates the communication of signals or data. Throughout the discussion of example embodiments, it should be understood that the terms "data" and "information" are used interchangeably herein to refer to text, images, audio, video, or any other form of information that can exist in a computer-based environment. The communication technology utilized by the components depicted in FIG. 1 may be similar to network technology used by network 99 or an alternative communication technology.

Each component depicted in FIG. 1 includes a computing device having a communication application capable of transmitting and receiving data over the network 99 or a similar network. For example, each can include a server, desktop computer, laptop computer, tablet computer, a television with one or more processors embedded therein and/or coupled thereto, smart phone, handheld or wearable computer, personal digital assistant ("PDA"), other wearable device such as a smart watch or glasses, wireless system access point, or any other processor-driven device.

In the example embodiment depicted in FIG. 1, the user computing device 110 is operated by an end-user or consumer, the computing network system 120 is operated by a computing network system operator, the malicious actor computing device 130 is operated by a malicious actor or other user, a counterparty computing device 140 is operated by a counterparty, and an identity verification system 150 is operated by an identity verification system operator.

As shown in FIG. 1, the user computing device 110 includes a data storage unit (not shown) accessible by a communication application 115 and an identity verification application 111. The communication application 115 on the user computing device 110 may be, for example, a web browser application or a stand-alone application, to view, download, upload, or otherwise access documents or web pages via the networks 99. The communication application 115 and the identity verification application 111 can interact with web servers or other computing devices connected to the network 99. The identity verification application 111 may be an application associated with the identity verification system 150, the computing network system 120, a financial institution, a third party identity verification system, the user computing device manufacturer, a mobile device service provider, or any other suitable system. In certain examples, actions described as being performed by the identity verification system 150 may be performed locally by the identity verification application 111 on the user computing device 110. Alternatively, actions described as being performed on or by the identity verification application 111 may be performed on the server 155 of the identity verification system 150.

In some embodiments, the user associated with a user computing device 110 can install an application and/or make a feature selection to obtain the benefits of the techniques described herein.

As shown in FIG. 1, the computing network system 120 includes a server 125. The server 125 or one or more other suitable devices are used to perform the computing functions of the computing network system 120. The computing network system 120 represents any computing system that the user and the counterparty may use to email, conduct meetings, conduct video conferences, exchange messages, collaborate on work projects, exchange social media messages, or perform any tasks that might include sensitive or proprietary information.

In an example, the server 125 stores received data, stores user account data, maintains identification and access management functions, hosts audio and/or video meetings, performs determinations related to user access, provides applications or website services, or performs any other suitable actions. Any other computing or storage function required by the computing network system 120 may be performed by the server 125. The server 125 may represent any number of servers, cloud computing devices, or other types of device for performing the tasks described herein.

As shown in FIG. 1, the malicious actor computing device 130 includes a data storage unit (not shown) accessible by a communication application 135 and an identity verification application 131. The communication application 135 on the malicious actor computing device 130 may be, for example, a web browser application or a stand-alone application, to view, download, upload, or otherwise access documents or web pages via the networks 99. The communication application 135 and the identity verification application 131 can interact with web servers or other computing devices connected to the network 99. The identity verification application 131 may be an application associated with the identity verification system 150, the computing network system 120, a financial institution, a third party identity verification system, the malicious actor computing device 130 manufacturer, a mobile device service provider, or any other suitable system. In certain examples, actions described as being performed by the identity verification system 150 may be performed locally by the identity verification application 131 on the malicious actor computing device 130. Alternatively, actions described as being performed on or by the identity verification application 131 may be performed on the server 155 of the identity verification system 150.

As shown in FIG. 1, the counterparty computing device 140 includes a data storage unit (not shown) accessible by a communication application 145 and an identity verification application 141. The communication application 145 on the counterparty computing device 140 may be, for example, a web browser application or a stand-alone application, to view, download, upload, or otherwise access documents or web pages via the networks 99. The communication application 145 and the identity verification application 141 can interact with web servers or other computing devices connected to the network 99. The identity verification application 141 may be an application associated with the identity verification system 150, the computing network system 120, a financial institution, a third party identity verification system, the counterparty computing device 140 manufacturer, a mobile device service provider, or any other suitable system. In certain examples, actions described as being performed by the identity verification system 150 may be performed locally by the identity verification application 141 on the counterparty computing device 140. Alternatively, actions described as being performed on or by the identity verification application 141 may be performed on the server 155 of the identity verification system 150.

The identity verification system 150 includes a server 155. The server 155 or other suitable device is used to perform the computing functions of the identity verification system 150. In an example, the server 155 stores received data from the computer network system 120, the computing devices 110, 130, 140, stores rules and policies, receives identification data, receives bio-identification data, performs determinations related to user access, creates secure codes, or performs any other suitable actions. Any other computing or storage function required by the identity verification system 150 may be performed by the server 155. The server 155 may represent any number of servers, cloud computing devices, or other types of device for performing the tasks described herein. In certain examples, some or all of the functions of the identity verification system 150 and the server 155 are performed by the computer network system 120 or any other suitable computing device or service. That is, the identity verification system 150 may be a function of, or operate on, the computer network system 120 or another suitable device. Alternatively, the computer network system 120 may be a function of, or operate on, the identity verification system 150 or another suitable device. In another example, the identity verification system 150 may be directly connected to the computer network system 120 and communicate directly instead of over the network 99. Any of the other computing devices may be similarly connected to one another.

Figure 4:
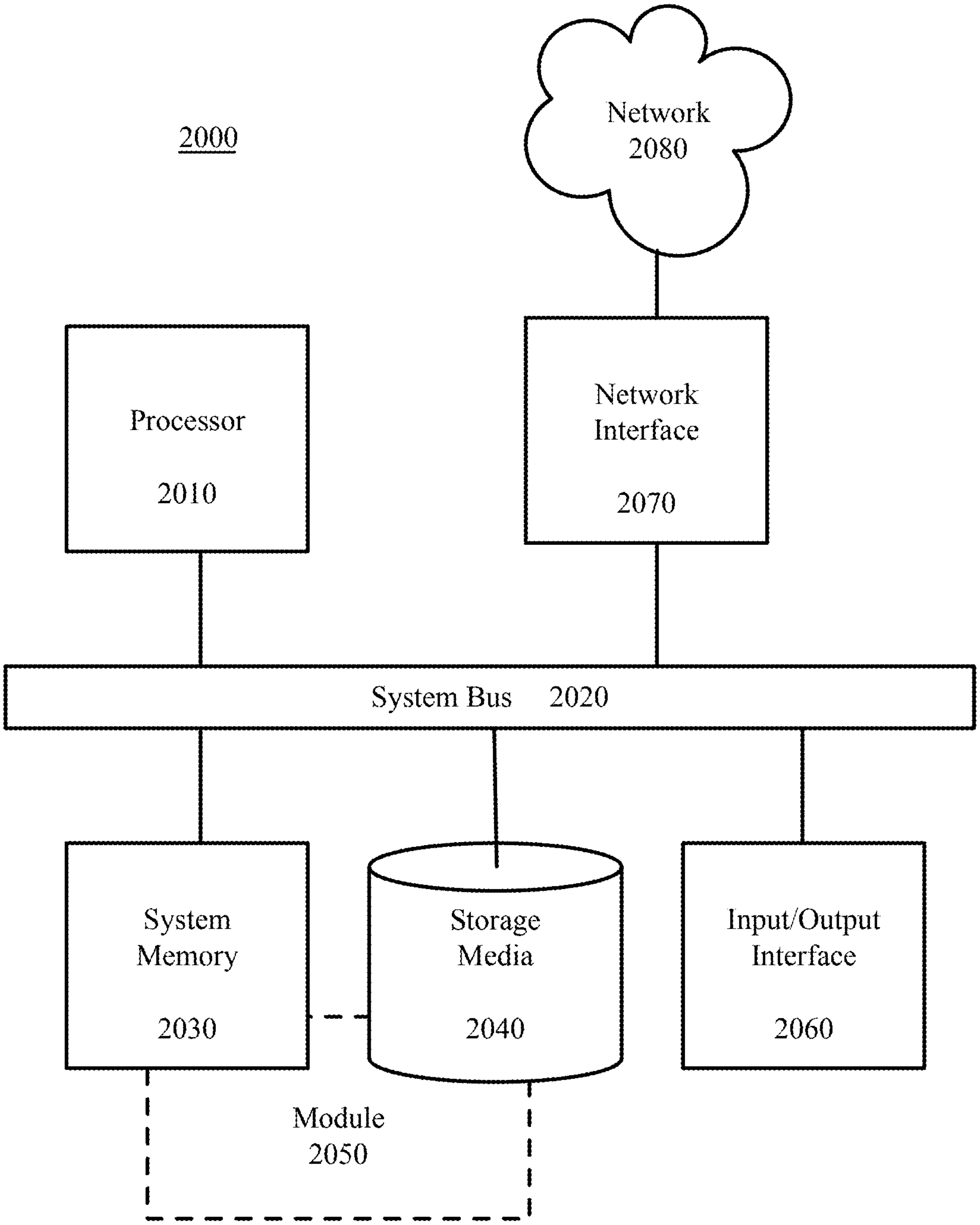
FIG. 4 depicts a computing machine and a module.

In example embodiments, the network computing devices and any other computing machines associated with the technology presented herein may be any type of computing machine such as, but not limited to, those discussed in more detail with respect to FIG. 4. Furthermore, any functions, applications, or components associated with any of these computing machines, such as those described herein or any other others (for example, scripts, web content, software, firmware, hardware, or modules) associated with the technology presented herein may by any of the components discussed in more detail with respect to FIG. 4. The computing machines discussed herein may communicate with one another, as well as with other computing machines or communication systems over one or more networks, such as network 99. The network 99 may include any type of data or communications network, including any of the network technology discussed with respect to FIG. 4.

Example Embodiments

Reference will now be made in detail to embodiments of the invention, one or more examples of which are illustrated in the accompanying drawings. Each example is provided by way of explanation of the invention, not as a limitation of the invention. Those skilled in the art will recognize that various modifications and variations can be made in the present invention without departing from the scope or spirit of the invention. For example, features illustrated or described as part of one embodiment can be used in another embodiment to yield a still further embodiment. Thus, the present invention covers such modifications and variations that come within the scope of the invention.

The technology for embodiments of the invention may employ methods and systems for verifying identifications of users in a potentially insecure application. The examples for embodiments of the invention may employ computer hardware and software, including, without limitation, one or more processors coupled to memory and non-transitory computer-readable storage media with one or more executable computer application programs stored thereon, which instruct the processors to perform such methods.

The system allows users communicating on potentially insecure applications to use a secure identification application or process on an identity verification system to verify to each other that the other party is actually who the person purports to be.

Figure 2:
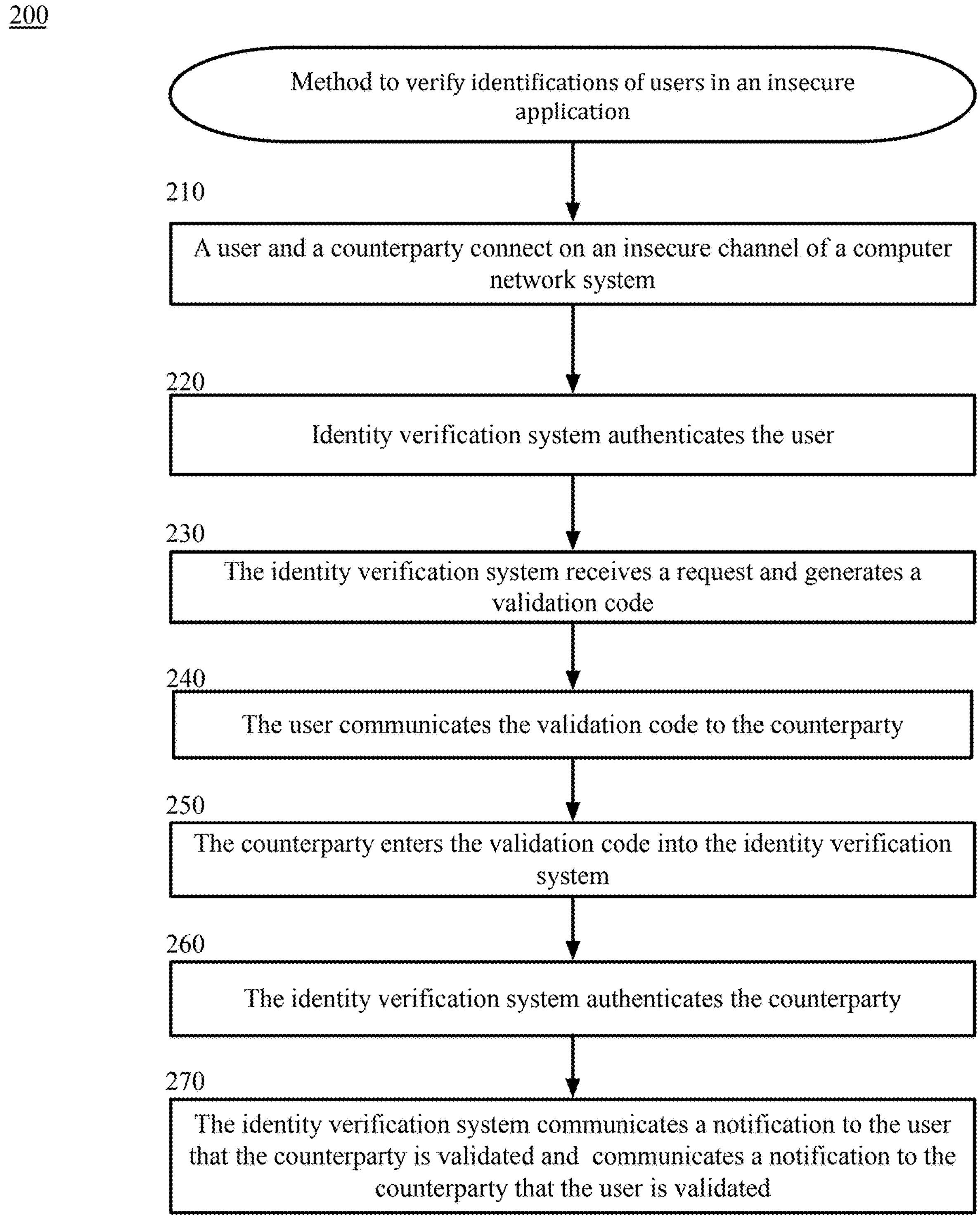
FIG. 2 is a block flow diagram depicting a method to verify identifications of users in a potentially insecure application.
Figure 3:
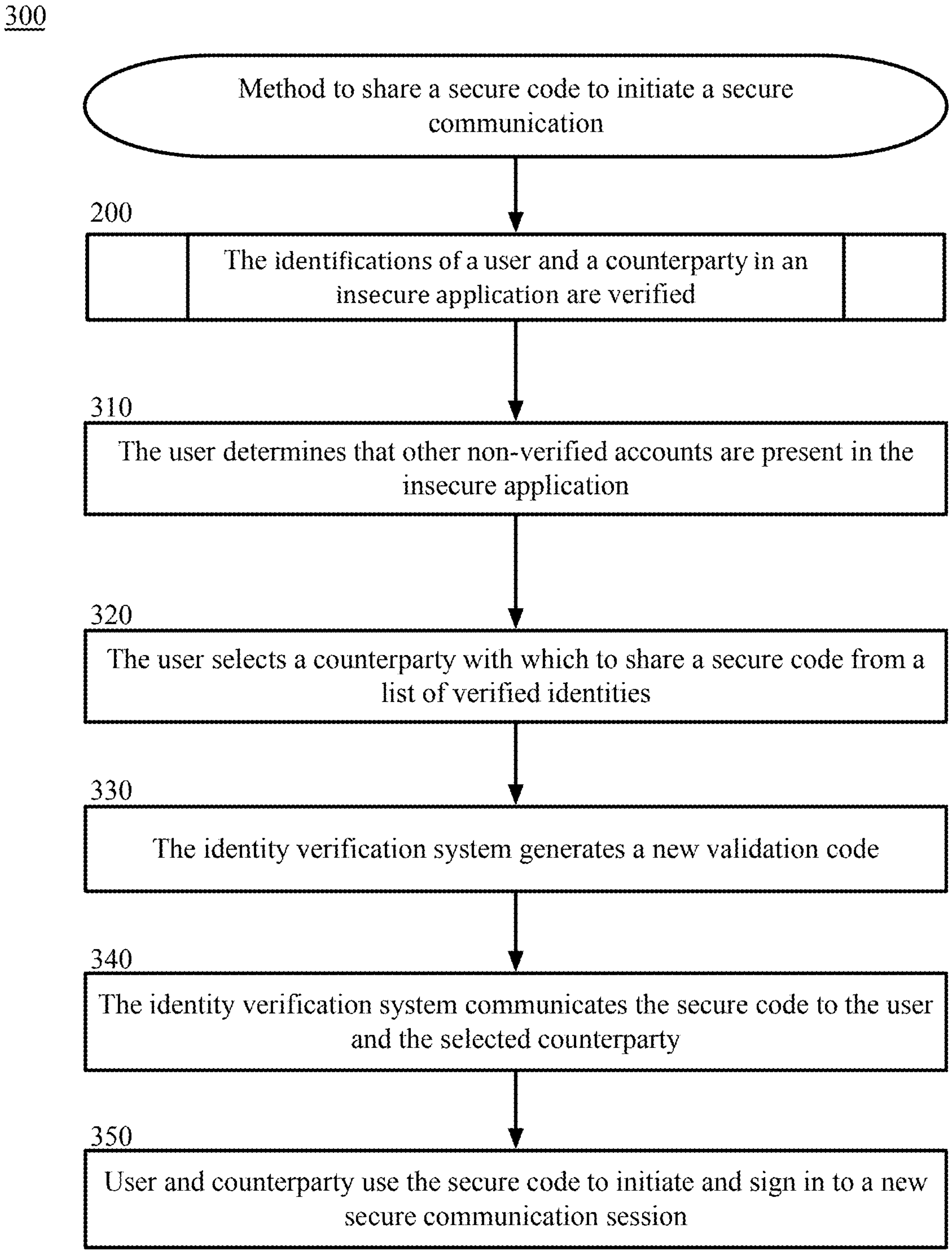
FIG. 3 is a block flow diagram depicting a method to share a secure code to initiate a secure communication.

The example methods illustrated in FIGS. 2-3 are described hereinafter with respect to the components of the example communications and processing architecture 100.

FIG. 2 is a block flow diagram depicting a method to verify identifications of users in a potentially insecure application, in accordance with certain examples.

In block 210, a user and a counterparty connect on a potentially insecure channel of a computer network system 120. The computing network system 120 may be a computing system that the user and the counterparty may use to email, conduct meetings, conduct video conferences, exchange messages, collaborate on work projects, or perform any tasks that might include sensitive or proprietary information. The computer network system 120 may be any suitable system operating the user experience for an organization or entity. The computer network system 120 may be employed by a financial institution, a university, an industrial organization, a government agency, a social network, or any other entity that interfaces with client or users. In alternate examples, the user and the counterparty connect on a technology other than the computer network system 120. For example, the user and the counterparty may communicate on an analog phone system or other non-digital technology. In another example, the user and the counterparty connect in person or over asynchronous paper-based communication. Any communication technology may be envisioned during which the participants desire to authenticate the identity of one or more other participants. Examples herein that describe the communication being over the computer network system 120 may also represent other forms of communication.

The computer network system 120 employs a server 125 or other devices to interface with users, host meetings, store files, access databases, or perform any other actions to allow users to conduct financial transactions, conduct conferences, register for events, place orders, or perform other suitable actions. The computer network system 120 desires to allow access to only authorized users to prevent accidental or malicious interference with sensitive documents, private applications, private conversations, secure databases, network management operations, or any other non-public functions. Users of the computer network system 120 may include individual customers, corporate entities, computer network system 120 employees, contractors, network service technicians, cloud provider system 140 employees, or any other suitable user.

The rules of the computer network system 120 are designed to prevent a malicious actor from gaining access to any secure or private programs, conversations, conferences, data, applications, or other feature of the computer network system 120. The malicious actor may attempt to gain access to these features from a malicious actor computing device 130. For example, the malicious actor uses a communication application 135 to log on to the computer network system 120. The malicious actor attempts to elevate or fabricate his or her privileges on the computer network system 120.

In an example, a malicious actors may attempt to identify user passwords or other identity information to gain access to restricted information on these applications. Some malicious actors may gain access to the identity information via system hacks, password leaks, social engineering, or any other illegal or unethical methods.

For example, a malicious actor may call a user under the guise of being a customer support representative for a financial account of the user. The malicious actor encourages the user, through deceitful means, to provide identification and authentication data, which the malicious actor uses to access a secure user account. Malicious actors may also use information gained through illegal entry into user accounts to learn about online meetings, video conferences, conference calls, and other password protected events where proprietary or secure information is being discussed. The malicious actor may use the information from the user accounts to infiltrate the event to gain access to the discussed information.

In an ongoing example, a user is contacted, such as on an online communication application, by a person purporting to be a customer service representative of a financial institution at which the user has an account. The representative requests that the user verify user account information, such as the user account number, user password, or other sensitive or secure information. In this example, the representative is assumed to be a counterparty, but may in fact be a malicious actor.

The user is suspicious if the representative is legitimately an employee of the financial institution and should be trusted with account details. The user desires to validate the identity of the counterparty to ensure that the account details are not being divulged to a malicious actor. The user recommends to the counterparty that, for safety and security purposes, the user and the counterparty should use the identity verification system 150 to validate and authenticate their identities.

In block 220, the identity verification system 150 authenticates the user. In an example, after agreeing to authenticate the identities, the user opens an identity verification application 111 on the user computing device 110 that is associated with the identity verification system 150. The identity verification application 111 may be a part of the communication application 115, a separate application, a website of the identity verification system 150, or any other useful user interface software or hardware for verifying identity on the identity verification system 150.

The user follows prompts or other instructions on the identity verification application 111 to verify that the user is actually the person associated with the user account. For example, the user scans a fingerprint, facial image, or any other biometric authentication feature. In another example, the user answers challenge questions. In another example, the user enters one or more passwords known only to the user. Any other suitable method of user authentication by the identity verification system 150 may be used. Additional security mechanisms that are not known to the user may be used by the identity verification system 150 to identify the user computing device 110 in addition to, or in lieu of, entered data from the user. For example, the identity verification system 150 may verify the user computing device 110 by innate properties, such as a device make and model, screen size, chip serial number, or other attributes of the user computing device 110. Alternatively, the identity verification system 150 stores secrets in the storage or secure/protected storage of the user computing device 110 and accesses the secrets to verify the device identity. If the identity verification system 150 receives the correct data, biometric information, and/or device data, then the user is authenticated to the identity verification system 150.

The identity verification system 150 authenticates the user by comparing the entered data, such as the fingerprint or the password, with stored user data. For example, the identity verification system 150 stores a database of user fingerprints and compares the received fingerprint to the stored fingerprints. If the received fingerprint matches a stored fingerprint, then the identity verification system 150 authenticates the user. In certain examples, the identity verification system 150 does not compare the actual received biometric data, password, or other data, but rather produces derivatives of the received data via secure calculations and compares the derivatives to stored data.

The authentication of the user may entail identifying the name of the user, a picture, an address, a job title, or any other useful information for identifying the user. The authentication ensures that the identifying information belongs to the person or entity that is representing the person that sent the request on the identity verification application 111, 141.

In block 230, the identity verification system 150 receives a request and generates a validation code. The identity verification application 111 on the user computing device 110 communicates a request to the identity verification system 150 to generate a secure code. The request may come from the communication application 115 of the user computing device 110, from the identity verification application 111, from an application associated with the financial institution, or any other suitable application, software, or hardware.

The validation code may be any suitable code generated by the identity verification system 150 to provide a secure one-time use code to be used in the single instance of the current communication. In other examples, the validation code may be associated with a user and changed daily, monthly, yearly, or on any other suitable schedule. The validation code may be a number, a barcode, a QR code, an image, an alphanumeric code, or any other suitable code. The code may be a unique code, a one-time use code, a randomly-generated code, or any other code that is unlikely to be predicted, stolen, guessed, or otherwise compromised. The code may be drawn from a database of usable codes, generated from an algorithm in real time, or generated in any other suitable manner.

The validation code is communicated to the user via any suitable technology. For example, the validation code is communicated to the identity verification application 111 over the Internet, or via a text, email, or other channel.

In block 240, the user communicates the validation code to the counterparty. The user may communicate the validation code in any suitable manner. For example, the user may read aloud an alphanumeric code to the counterparty to allow the counterparty to enter the validation code. In another example, the user may digitally or physically show the code to the counterparty, such as by displaying a QR code on a screen of the user computing device 110. In another example, the user transmits the code to the counterparty via the identity verification application 111 or other communication technology, such as an email, a text message, or on an application associated with the financial institution. In another example, the user enters a request for the identity verification system 150 to send the code to the counterparty via the identity verification application 141. In alternate examples, the identity verification application 111 communicates the validation code to the counterparty identity verification application 141 autonomously. That is, upon receiving the verification code, the identity verification application 111 does not wait for the user to direct the forwarding of the validation code to the counterparty. The identity verification application 111 automatically communicates the validation code. The identity verification system 150 may send the code via any suitable technology, such as an email, a text message, or on an application associated with the financial institution.

In block 250, the counterparty enters the validation code into the identity verification system 150. In an example, the counterparty opens an identity verification application 141 on the counterparty computing device 140 that is associated with the identity verification system 150. The identity verification application 141 may be a part of the communication application 145, a separate application, a website of the identity verification system 150, or any other useful user interface software or hardware for verifying identity on the identity verification system 150.

The identity verification system 150 receives the validation code and determines that the counterparty and the user associated with the validation code desire to authenticate one another. The entering of the validation code prompts the identity verification system 150 to begin a process of authenticating the counterparty identity and communicating that authentication to the user computing device 110.

In block 270, the identity verification system 150 authenticates the counterparty. The counterparty follows prompts or other instructions on the identity verification application 141 to verify that the counterparty is actually the person associated with the counterparty account. For example, the counterparty scans a fingerprint, facial image, or any other biometric authentication feature. In another example, the counterparty answers challenge questions. In another example, the counterparty enters one or more passwords known only to the counterparty. Any other suitable method of user authentication by the identity verification system 150 may be used. If the counterparty enters the correct data or biometric information, then the counterparty is authenticated to the identity verification system 150.

The identity verification system 150 authenticates the counterparty by comparing the entered data, such as the fingerprint or the password, with stored counterparty user data. For example, the identity verification system 150 stores a database of counterparty fingerprints and compares the received fingerprint to the stored fingerprints. If the received fingerprint matches a stored fingerprint, then the identity verification system 150 authenticates the counterparty.

In block 260, the identity verification system 150 communicates a notification to the user that the counterparty is validated and communicates a notification to the counterparty that the user is validated. The notification may include any useful information in identifying the counterparty, such as the counterparty's name, photo, username, job title, or other data.

The notification may be via any suitable communication technology or process. For example, the identity verification system 150 communicates the identity of the counterparty to the user via the identity verification application 111, the communication application 115, or any other suitable communication channel.

The user compares the data in the notification to determine if the counterparty's identify matches the identity the counterparty has claimed to the user. If the identity verifies the expected identity of the counterparty, then the user is assured that a malicious actor is not posing as the counterparty. If the identity does not match the expected identity, then the user may end the communication, request more information from the counterparty, or perform any other action to safeguard the secure information of the user. For example, if the counterparty claimed to be John Doe, a customer service representative with a particular financial institution and the notification states that the counterparty is John Doe, a customer service representative with the particular financial institution, then the user is assured that a malicious actor is not involved. If a different name or title is sent as the identity of the counterparty, then the user may suspect that a malicious actor is masquerading as John Doc.

FIG. 3 is a block flow diagram depicting a method to share a secure code to initiate a secure communication, in accordance with certain examples.

In block 200, the system verifies identifications of users in a potentially insecure application, as described in greater detail in the method 200 of FIG. 2. Any suitable sequence of authentication of each user may be used, such as the user authentication described in block 220.

In block 310, after verifying users and counterparties, the user determines that other non-verified accounts are present in the potentially insecure application. In a continuing example, the user and the counterparty are participating in a group video conference on the computing network system 120. In an example, the authenticated users are displayed in a list on a user interface of the group video conference. The list may be only authenticated users or the list may be a list of any user signed into the group video conference. For example, if a user started a group video conference and sent out sign in credentials, each user and counterparty may be signed into the group video conference. In an example, other counterparties, such as a malicious actor may also have obtained the credentials and signed into the group video conference. Any or all of these counterparties may be displayed in the list of attendees.

In the example, the user may recognize that a third account is present on the call in addition to an expected single counterparty. The user may query if either the user or the counterparty has a second account signed into the potentially insecure application, such as from a second computing device. If not, then the user suspects that a malicious actor has signed onto the video conference after gaining access to identity information of a participant via system hacks, password leaks, social engineering, or any other illegal or unethical methods. That is, a malicious actor has learned the password or other details for joining the video conference from the malicious actor computing device 130. The malicious actor has joined the meeting and disguised his or her identity, such as by entering a username or other information to appear as an invited guest.

In an alternate example, the user desires to verify all counterparties even if a malicious actor is not suspected. In an example, the user is discussing a private matter and wishes to verify all users before continuing with the discussion. In another example, the user is discussing a secure corporate matter and corporate policy demands that all attendees be verified. In another example, a policy may require that that the password for all secure meetings only be distributed in the secure manner described herein. In another example, the communication platform, such as a video conference application managed by the computing network system 120 requires all passwords be distributed in the secure manner described herein. Any other suitable reasons for employing the method described herein may be envisioned.

In block 320, the user selects a counterparty with which to share a secure code from a list of verified identities. In the example, the list of attendees to the video conference may include the user, the counterparty, and the suspicious account. In an example, the counterparty may appear to be signed in from both a mobile device and the counterparty computing device 140. The counterparty states that the counterparty is not signed in from the mobile device and this account is therefore suspicious. The user thus desires to share a secure code with the counterparty account that is signed in from the counterparty computing device 140 but not the account signed in from the mobile device.

In an example, the user reports the suspicious account to the identity verification system 150, the computer network system 120, or any other associated party. For example, the computer network system 120 may record details about the suspicious party information to identify patterns in suspicious behavior. The computer network system 120 may investigate data associated with the suspicious account, such as the model of the computing device used, the location of the suspicious account device, or other details to help investigate malicious actions and suspicious accounts.

In block 330, the identity verification system 150 generates a secure code. The secure code may be generated in a similar manner in which the identity verification system 150 generates the validation code as described in greater detail in block 230 of FIG. 2. The secure code is generated by the identity verification system 150 such that the user, the counterparty, or the suspicious account do not have access to the secure code until the identity verification system 150 communicates the secure code to the user and the counterparty. The user, the counterparty, or the suspicious account are unable to manipulate or predict the secure code.

In block 340, the identity verification system 150 communicates the secure code to the user and the selected counterparty. The validation code is communicated to the user and the counterparty via any suitable technology. For example, the validation code is communicated to the identity verification application 111, 141 over the Internet, or via a text, email, or other channel. If the identity verification system 150 does not send the code to a party that is on the list of attendees to the video conference, then the party, such as the malicious actor, is not able to guess, copy, read, or manipulate the code. The validation code is communicated in a manner that prevents other parties from viewing the code. For example, if the validation code is communicated to the identity verification application 111, 141 over the Internet, then the validation code will only display on the user computing device 110 and/or the of the counterparty computing device 140. The malicious actor is unable to view the validation code even if the malicious actor has in some manner hacked the email system of the user or the counterparty.

In block 350, the user and counterparty use the validation code to initiate and sign into a new secure communication session. For example, the user tells the counterparty that the user will open a new video conference meeting with the validation code as the password for entry. The user closes the current video conference meeting and opens a new video conference meeting with the validation code set as the password. Only the authenticated users that have the validation code are able to enter the correct password to join. The malicious actor did not receive the validation code and is unable to join the new secure communication session. Even if the user and the counterparty state aloud in the group video conference that they are going to join the new group video conference, the malicious actor is unable to join because the malicious actor does not have the agreed upon password.

The continuing example was directed to a video conference, but any other suitable communication session may apply the methods herein. For example, the secure communication session may be a group text message, an online communication with a financial institution, a group email exchange, a conference call, group conversations on social media, shared documents on a cloud computing service, or any other type of group communication that requires security from non-authenticated users.

Example Systems

FIG. 4 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, Fire Wire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device, for example, a system on chip (SOC), system on package (SOP), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Additionally, any reference to an act being performed by a computer should not be construed as being performed by a single computer as more than one computer may perform the act.

The examples described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different example examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A system to allow counterparties to verify one another, the system comprising:

one or more processors; and one or more storage devices storing application code instructions that when executed by the one or more processors cause the one or more processors to:

determine that a new user has accessed a first communications channel associated with a first application, wherein a user using a user computing device is in communications with a counterparty using a counterparty computing device;

in response to determining that the new user has accessed the first communications channel, transmit, using a second application on the user computing device, to an identity verification network server, a request to authenticate the user and the counterparty, wherein the request is transmitted over a communications channel that is separate from the first communications channel;

receive, from the identity verification network server, a validation code upon authenticating the user, wherein the identity verification network server authenticates the counterparty and, based on authenticating the counterparty, transmits the validation code to the counterparty computing device;

in response to receiving the validation code, generate a new secure communication session that is accessed using a passcode that is generated based on the validation code having been received by both the user computing device and the counterparty computing device; and communicate, to the counterparty computing device, an indication of the new secure communication session.

2. The system of claim 1, wherein the application code instructions further cause the system to communicate an indicator of authentication of the user to the counterparty computing device.

3. The system of claim 1, wherein the application code instructions further cause the system to associate the counterparty with the user based on the validation code.

4. The system of claim 1, wherein the first communications channel is associated with the first application.

5. The system of claim 1, wherein authentication of the counterparty comprises one or more of a picture and a name of the counterparty.

6. The system of claim 1, wherein the request is transmitted using the first communications channel and each user is authenticated using user authentication data.

7. The system of claim 6, wherein the user authentication data is a biometric data entry.

8. The system of claim 1, wherein the application code instructions for generating the new secure communication session between the user computing device and the counterparty computing device, cause:

generating a new video conference session having a secure passcode for accessing the new video conference session, wherein the secure passcode is generated based on the validation code received by both the user computing device and the counterparty computing device.

9. The system of claim 1, wherein the application code instructions for generating the new secure communication session between the user computing device and the counterparty computing device, cause:

generating a new video conference session having a secure passcode for accessing the new video conference session; and setting the secure passcode to the validation code received by both the user computing device and the counterparty computing device.

10. The system of claim 1, wherein the user communicates the validation code to the counterparty.

11. The system of claim 10, wherein the user communicates the validation code verbally.

12. The system of claim 1, wherein the user computing device automatically communicates the validation code to the counterparty computing device upon receiving the validation code.

13. A method comprising:

determining that a new user has accessed a first communications channel associated with a first application, wherein a user using a user computing device is in communications with a counterparty using a counterparty computing device;

in response to determining that the new user has accessed the first communications channel, transmitting, using a second application on the user computing device, to an identity verification network server, a request to authenticate the user and the counterparty, wherein the request is transmitted over a communications channel that is separate from the first communications channel;

receiving, from the identity verification network server, a validation code upon authenticating the user, wherein the identity verification network server authenticates the counterparty and, based on authenticating the counterparty, transmits the validation code to the counterparty computing device;

in response to receiving the validation code, generating a new secure communication session that is accessed using a passcode that is generated based on the validation code having been received by both the user computing device and the counterparty computing device; and communicating, to the counterparty computing device, an indication of the new secure communication session.

14. A method, comprising:

joining, by a user computing device, a first group application session of a first application;

determining that a new user has accessed the first group application session of the first application;

in response to determining that the new user has accessed the first group application session of the first application, communicating, to an identity verification system device, a request to generate an authentication code and to communicate the authentication code to a counterparty computing device, the counterparty computing device being associated with a counterparty;

receiving, from the identity verification system device, the authentication code, wherein the authentication code is received by the counterparty computing device; and in response to receiving the authentication code, generating, a second group application session, the second group application session being accessed using a passcode that is generated based on the authentication code having been received by both the user computing device and the counterparty computing device.

15. The method of claim 14, further comprising authenticating, by the identity verification system device, the user computing device and one or more counterparties in the first group application session.

16. The method of claim 14, wherein the authentication code is withheld from the new user.

17. The method of claim 14, further comprising joining, by the user computing device and the counterparty computing device, the second group application session by signing in with the authentication code.

18. The method of claim 14, wherein the user computing device communicates the request to generate the authentication code based on a determination that a suspicious party is participating in the first group application session.

19. The method of claim 14, wherein the counterparty computing device is associated with the counterparty on a list of one or more authenticated counterparties in the first group application session, and wherein the user computing device selects the counterparty computing device to which the identity verification system device is to send the authentication code from the list of one or more authenticated counterparties.

20. The method of claim 14, wherein generating the second group application session comprises:

generating a new video conference session having a secure passcode for accessing the new video conference session; and setting the secure passcode to the authentication code received by both the user computing device and the counterparty computing device.

* * * * *